(12) United States Patent
Mattern

(10) Patent No.: US 7,991,706 B2
(45) Date of Patent: Aug. 2, 2011

(54) VIRTUAL MAILING SYSTEM

(75) Inventor: James Michael Mattern, Bethany, CT (US)

(73) Assignee: Neopost Technologies, Bagneux (FR)

( * ) Notice: Subject to any disclaimer, the term of this patent is extended or adjusted under 35 U.S.C. 154(b) by 883 days.

(21) Appl. No.: 11/761,913

(22) Filed: Jun. 12, 2007

(65) Prior Publication Data

US 2008/0313105 A1 Dec. 18, 2008

(51) Int. Cl.
*G06F 17/00* (2006.01)
(52) U.S. Cl. ...................................... 705/401
(58) Field of Classification Search ................ None
See application file for complete search history.

(56) References Cited

U.S. PATENT DOCUMENTS

| | | | | |
|---|---|---|---|---|
| 5,508,817 A * | 4/1996 | Kunigami | ................ | 358/402 |
| 5,805,810 A * | 9/1998 | Maxwell | ................ | 709/206 |
| 5,999,967 A * | 12/1999 | Sundsted | ................ | 709/206 |
| 6,732,152 B2 * | 5/2004 | Lockhart et al. | ................ | 709/206 |
| 6,951,516 B1 * | 10/2005 | Eguchi et al. | ................ | 463/40 |
| 7,103,211 B1 * | 9/2006 | Medioni et al. | ................ | 382/154 |
| 7,386,520 B2 * | 6/2008 | Hehl et al. | ................ | 705/400 |
| 7,519,559 B1 * | 4/2009 | Appelman | ................ | 705/60 |
| 7,677,973 B2 * | 3/2010 | Van Luchene | ................ | 463/29 |
| 2005/0160147 A1 * | 7/2005 | Denney et al. | ................ | 709/206 |
| 2006/0101115 A1 * | 5/2006 | Gleckman | ................ | 709/203 |
| 2007/0246523 A1 * | 10/2007 | Reblin | ................ | 235/375 |
| 2008/0005250 A1 * | 1/2008 | Oksum | ................ | 709/206 |

OTHER PUBLICATIONS

"USe avatars to enhance your sales messages online. (Brief Article)", Rintels, Trish, Selling, p. 3 Sep. 2001.*

* cited by examiner

*Primary Examiner* — Rutao Wu
(74) *Attorney, Agent, or Firm* — Morris & Kamlay LLP

(57) ABSTRACT

A virtual mailing system includes a virtual post office disposed in a virtual environment. A user in the virtual environment can request for the delivery of an electronic asset. A postage metering device, associated with the virtual post office, is operative to review the aspects of the delivery of the electronic asset and affix a postage amount. The postage metering device is also operative to process monetary funds relating to payment of postage for the virtual delivery of the electronic asset. The processing of monetary funds includes coordinating between virtual funds and real world funds so that virtual customers pay for delivery costs using virtual funds backed by real world currency. Through the virtual post office, electronic assets may then be virtually delivered to intended recipients within the virtual environment.

47 Claims, 8 Drawing Sheets

US 7,991,706 B2

VIRTUAL MAILING SYSTEM

COPYRIGHT

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyright rights whatsoever.

FIELD OF THE INVENTION

The present invention relates generally to a delivery system for electronic assets and more specifically to postage and metering operations for the delivery of an electronic asset in a virtual computing environment.

BACKGROUND OF THE INVENTION

The physical distribution of items, e.g. postcards, letters, packages, etc. is very well established. In current physical worlds, getting an item delivered to another person can be accomplished in a myriad of ways, not the least of which is the U.S. Postal system. The electronic distribution of messages is also very well established, for example sending electronic mail (email) to various recipients.

These existing systems and techniques are known in the physical world. With the advancement of computing resources and user interaction, virtual worlds are growing phenomenon. One incarnation of this virtual world is a multi-player interactive environment, also commonly known as MMOs. There are also other types of virtual environments, such as the presently popular environment known as "Second Life" as created and maintained by Linden, Corp.

In these virtual environments, there currently does not exist any means for delivering or transmitting elements between users. There are rudimentary features, such as "Message of the Day" (MOTD) feature, where a person may leave a message for others to view, but there does not exist any parallel functions as found in the physical world for the delivery of assets.

For example, in the Second Life virtual environment, users can make items and perform services for virtual payments. This environment includes a floating currency, commonly referred to as "Linden Dollars" that users exchange for real dollars. Users can purchase a plot of virtual land and then pay someone to build them a virtual house. They can purchase virtual furnishings and have someone virtually decorate their virtual house. In this virtual environment though, a person cannot send a package or a message to another user.

There exists a need for a virtual delivery system which can offer additional features beyond the existing email (or other techniques, such as SMS) or physical mail techniques. Such a virtual delivery system may be able to address many of the limitations of traditional delivery methods. For example, the mechanisms that may be used to deliver messages in current virtual environments are limited in their ability to deliver those items. One way in which such delivery mechanisms are limited is in their ability to deliver items to users who are not currently online. Current mechanisms generally work only when both the sender and the recipient are online, in the virtual environment, at the same time. Embodiments of the present invention can address this limitation, providing a virtual mailing system which is not so limited.

In addition, current methods of message delivery may be insufficiently secure for the transmission of sensitive or valuable messages. A virtual mailing system may provide for the secure delivery of messages within virtual environments, ensuring that messages are read and received by only the intended recipient.

A virtual mailing system may also provide features to support new and uniquely online endeavors. For example, there is a growing trend among the users of virtual environments to participate in "farming" operations, where users perform operations in a virtual world to earn items and then sell those items online as virtual wares. A purchaser might, upon payment, receive an authorization or access code from the seller, which can be then used to recreate the virtual element. However, the payment for and delivery of such items in virtual environments are constrained by existing delivery channels in ways addressable by a virtual mailing system.

A virtual mailing system may also provide features that cannot be provided through traditional means. For example, there exist numerous opportunities for merging a virtual delivery system with existing systems in the physical world. A virtual mailing system may provide for the physical delivery of items sent from within the virtual world. A virtual mailing system might also allow physical items to be represented and delivered in the virtual world.

Therefore, there exists a need for a virtual mailing system, such as the system described below, that can address these and similar needs.

DETAILED DESCRIPTION

A virtual mailing system can merge real world and virtual endeavors to provide the transmission and delivery of virtual assets in the virtual environment, also colloquially referred to as the "metaverse." The virtual mailing system can include a virtual post office disposed in the virtual environment. The virtual post office can be capable of receiving the electronic asset and facilitating delivery of the asset. In addition, the virtual post office can include metering functionality such that a person sending the electronic asset can provide a payment for delivery and/or other associated services virtually rendered. The metering of the virtual post office can be synchronized with one or more real world financial instruments such that virtual payments are backed by actual physical currency, other physical monetary instruments, lines of credit, prepaid accounts, etc.

Figure 1:
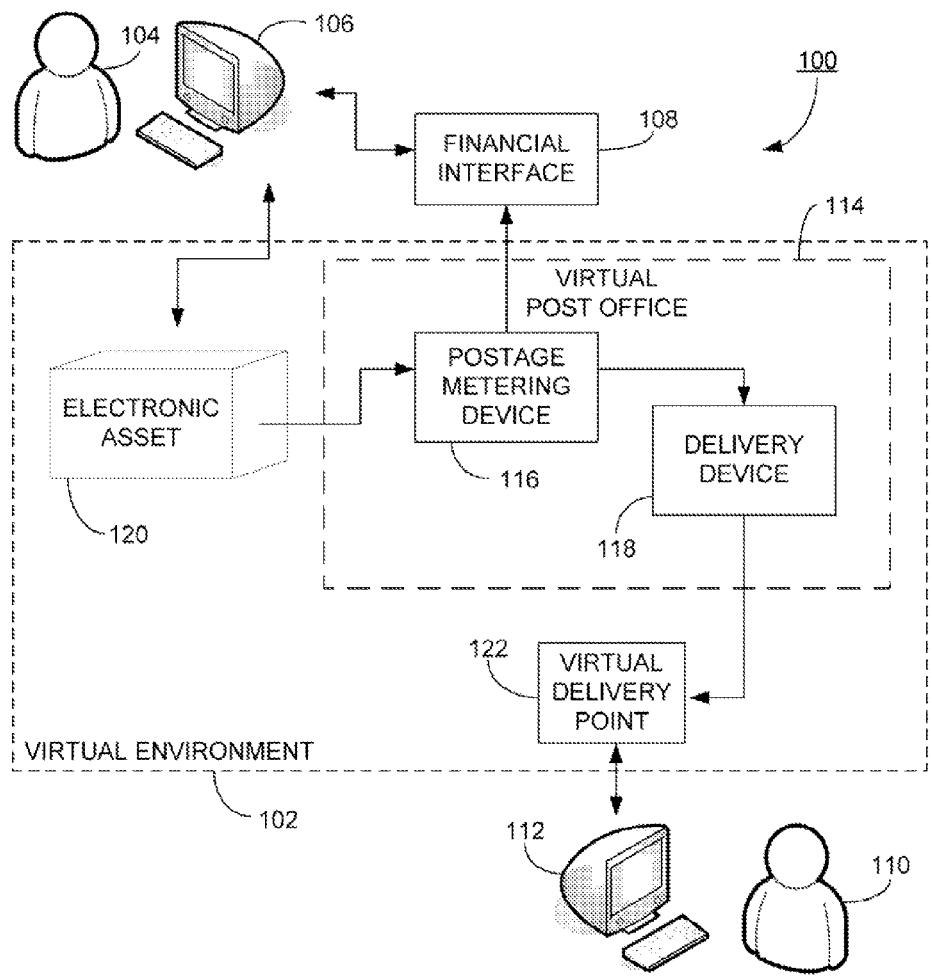
FIG. 1 illustrates one embodiment of an electronic postage system.

FIG. 1 illustrates an exemplary system 100 that includes a virtual environment 102. The system 100 also includes a first user 104 operating a first computing device 106, a financial interface 108, a second user 110 and a second computing device 112. The virtual environment 102 includes a virtual post office 114 including a postage metering device 116 and a delivery device 118, an electronic asset 120 and a virtual delivery point 122. The first computing device 106 and the second computing device 112 may be any suitable type of computing devices capable of and/or operative to connect to the virtual environment in response to operations by the users 104 and 110, respectively. The connection to the virtual environment 102 may be done using any suitable technique, such as logging in through a secured portable, wirelessly connecting through an Internet service provider, etc.

The virtual environment 102 can represent a computational environment that, through executable code and interoperative processing systems, can generate a virtual environment. An example of a virtual environment is a Massively Multi-player Online (MMO) game, such as the current popularly games "World of Warcraft" and "Everquest" for example. Another example of a virtual environment may be a virtual world, such as the presently known "Second Life" environment. The virtual environment need not be strictly limited to a visual virtual environment where a user (e.g. 104 or 106) can navigate the environment using a representative avatar. The virtual environment can include any combination of interconnected and/or networked systems whereby the first user 104 is capable of sending and/or receiving an electronic document to/from the second user 110.

The financial interface 108 may be one or more computing systems allowing for the first user 104, through the first computer 106, to interface financial information for usage by the virtual post office 114. The financial interface 108 may be associated with the virtual environment 102, such as a central profile location for a subscription-based metaverse. The financial interface 108 may also be independent of the virtual environment, providing a service for interacting with the virtual post office, such as for example a physical postage metering device having processing operations for interacting with the virtual environment, a third party financial interface application, a bank, a credit card company, a prepaid account system, etc.

The postage metering device 116 may perform processing operations executed by processing devices supporting or operating in conjunction with the virtual environment 102. For example, the postage metering device 116 may be an applet that performs postage metering operations as described in further detail below. The delivery device 118, similar to the postage metering device 116 may be composed of executable code executed within or in conjunction with the processing of the virtual environment 102. For example, the virtual environment 102 may include a sub-routine or sub-process associated with the virtual post office 114, where this process or operation activates the routines of the metering device 116 and the delivery device 118. The electronic elements, such as 108, 114, 116 and 118 may be programmed in the native virtual environment using any suitable encoding or operating techniques as recognized by one skilled in the art where the programmed elements are operative to perform the functions as described herein.

Post office 114 and devices 116, 118 may include physical processing devices having physical characteristics, such as hard-wired components or other hardware operating in conjunction with processing instructions, for performing the below-noted functions. Additionally, one or more users may actually purchase the virtual post office or the metering device and provide mailing services to third parties for a fee.

The electronic asset 120 may be any suitable type of element capable of being represented and subsequently delivered in the virtual environment 102. The asset 120 may be an electronic document itself or may, in another embodiment, be a reference or link to an electronic document. The asset 120 may also include source code, script, executable operations, electronic content (possibly including graphics, audio, video, etc.) representing an element or object within a virtual environment, such as for example a virtual item in a virtual universe.

The virtual delivery point 122 may be represented in the virtual environment as a depository for holding delivered items. For example, a virtual mailbox may be graphically represented as an actual mailbox similar to real world mailboxes. In this example, users may possess virtual property within the virtual environment. Depicted on this virtual property may be a virtual mailbox. The virtual mailbox may serve as a delivery point within the virtual environment and may include a delivery indicator, such as a depiction of the traditional red flag attached to the mailbox. In another example, the virtual delivery point 122 may be an avatar representing the individual user. In this case, the virtual package can be delivered directly to the avatar. In yet another example, the virtual delivery point 122 may be any suitable memory location in a computing environment for storing data representing the delivered item. In this example, a notification of the attempted delivery of the item, a link to the delivered item, or any other suitable representation that allows for receipt of an electronically delivered electronic asset may be provided. In one instance, a menu, accessible during use of the virtual environment, but outside of the virtual environment, may serve to provide delivery of a virtual package.

Figure 2:
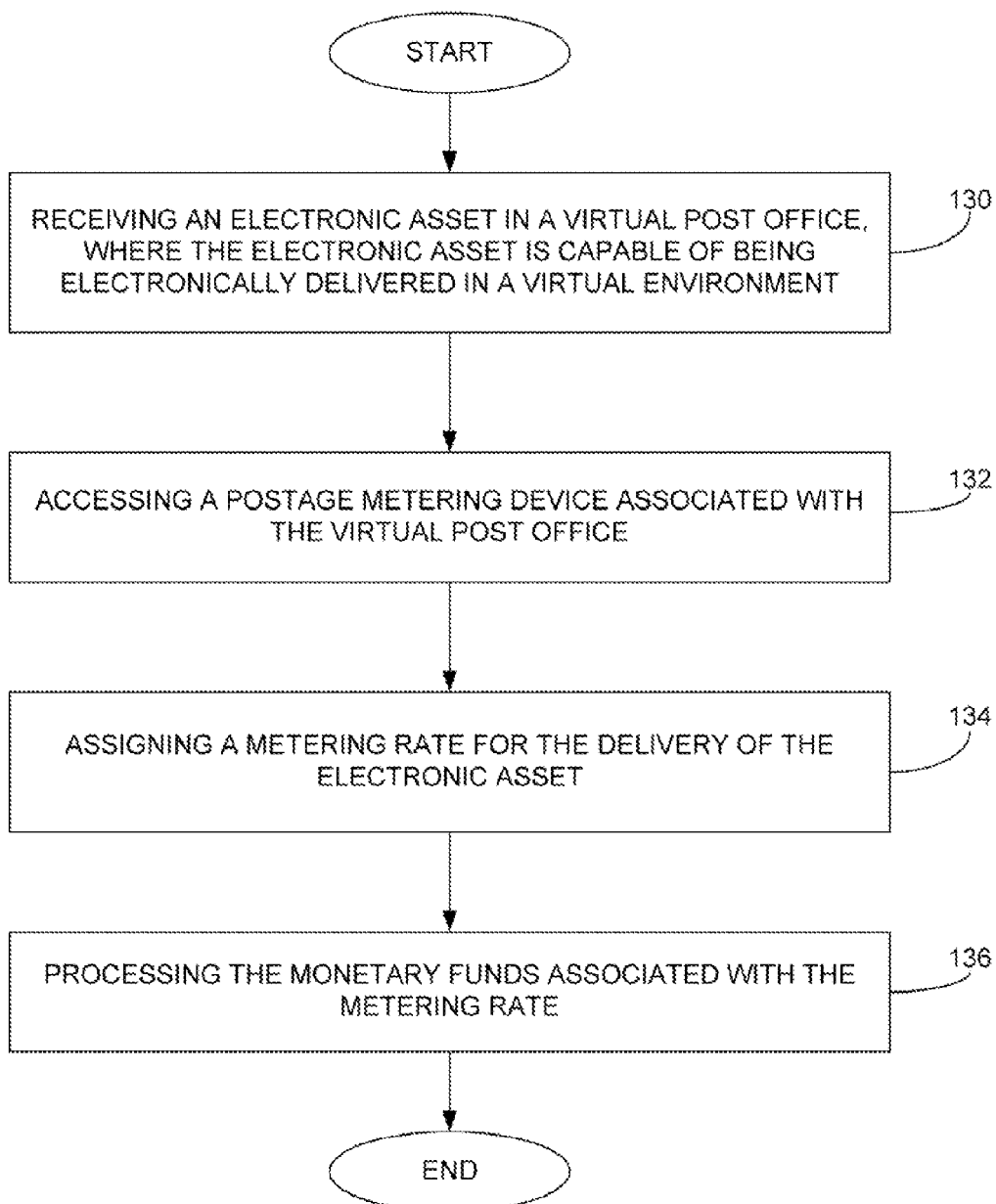
FIG. 2 illustrates a flowchart of the steps of one embodiment of a method for virtual mailing.

In one embodiment, the operation of the system 100 is described relative to the flowchart of FIG. 2. The flowchart illustrates an embodiment of a method for virtual mailing including a first step, step 130, of receiving an electronic asset in a virtual post office, where the electronic asset can be electronically delivered in the virtual environment. The electronic asset 120 can be received in the virtual post office 114. In one embodiment, the electronic asset 114 may be provided from the computer 106, such as an electronic document stored on the computer and loaded into the virtual environment 102 using known data transfer techniques. The electronic asset 120 may be disposed in a virtual envelope or other type of carrier mechanism, such as having Meta data or instructional data attached thereto or the asset itself being attached to a delivery object or set of execution code, for example.

Within the method of FIG. 2, the next step, step 132, can include accessing a postage metering device associated with the virtual post office. Accessing this device 116 may be performed by the user 104 virtually entering the virtual post office 114 or by any other suitable mechanism, such as by sending explicit instructions to the device 116. A third-party provider monitoring or controlling the virtual post office 114, such as a virtual post office service provider, may also access the device 116.

In this embodiment, the next step, step 134, can include assigning a metering rate for the delivery of the electronic asset. This metering rate assignment may be performed by the postage metering device, which can determine a shipping or delivery rate and thereby meter the asset or a delivery mechanism for the asset with the metered rate. For example, metering may be based on the size of the asset, such as an analogous comparison of megabytes to ounces or pounds in the physical world. As discussed in further detail below, metering may also be based on additional features such as security, delivery confirmation, speed of delivery, or other various factors that can be offered to the sender as ancillary shipping options or features.

In one embodiment, the next step of the method, step 136, can be processing the monetary funds associated with the metering rate. This step may be performed by the postage metering device 116 processing metering functions with the financial interface 108. By way of example, the processing of monetary funds may include the allocation of real world currency funds to virtual funds and processing an exchange rate, such as exchanging real dollars for virtual dollars to cover the metered costs. In another embodiment, the physical monetary funds may be converted directly from a first physical currency (e.g. dollars) to a second physical currency (e.g. euros) without requiring a middleman or a currency exchange interface.

Referring back to FIG. 1, the virtual post office can include the additional feature of electronic asset delivery. The delivery device 118 may be a routing mechanism for processing and transmitting the electronic asset. In another embodiment, the delivery device 118 may be executable code in the virtual environment representing an actual delivery service, such as an electronic document delivery system including virtual trucks, virtual drivers, etc.

Within the virtual environment 102, the delivery device 118 can be operative to deliver the electronic asset to the virtual delivery point 122. As explained above, this virtual delivery point 122 may be provided in a variety of forms and may be specifically designated for the second user 110 or may be any other suitable type of storage location, such as a virtual public storage location or a virtual notification service that notifies the second user 110 that an electronic asset is waiting.

The second user 110, through the second computing device 112, may access the virtual delivery point 122 and subsequently receive the electronic asset 120. Receipt may include extracting the electronic asset from the virtual environment using any suitable download/upload techniques, opening the electronic asset in the virtual environment, using an identifier or other object relating to the electronic asset to access another object or perform an ancillary operation in the virtual environment, or any other suitable technique.

Figure 3:
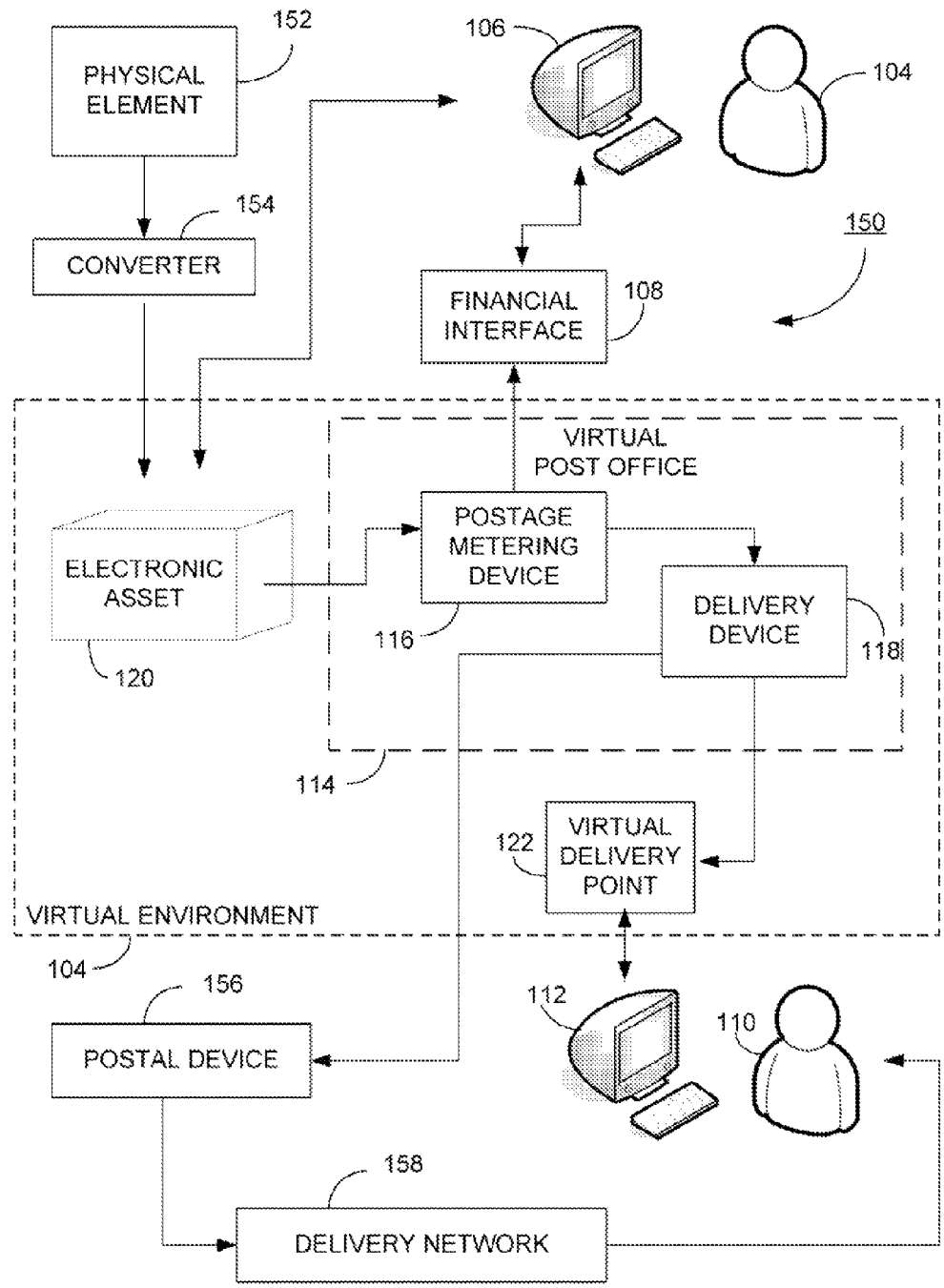
FIG. 3 illustrates another embodiment of the electronic postage system in conjunction with a physical postal delivery system.

FIG. 1 illustrates an embodiment of delivery within the virtual environment 102, but the virtual post office 114 may also operate complimentarily to a physical post office or real world delivery system. FIG. 3 illustrates another embodiment of a system 150 that can include the elements of FIG. 1. In addition, the system 150 can also include a physical element 152, a converter 154, a postal device 156 and a delivery network 158.

The physical element 152 may be any suitable physical component, such as physical document or other tangible element. The converter 154 may be any suitable element capable of converting the physical element into an electronic asset, such as a scanning device to scan a document or a 3D scanner to scan a physical object. The converter 154 may also be any suitable type of component, executed in hardware, software or a combination thereof for allowing the physical element to be delivered or a reference to the element to be delivered within the virtual environment 104.

The postal device 156 may be any device in operative communication with the delivery device 118 of the virtual post office 114 that can allow for the physical delivery of a physical representation of the electronic asset. By way of example, if the electronic asset is a virtual message, the postal device 156 may include functionality to print out the message and facilitate delivery of the message using a physical delivery system. The postal device 156 may be a combination of various elements, such as one or more third party service providers that perform the various operations or the postal device may also be a self-contained system, which may include postage metering functionality and known accounting techniques for tracking fund payment allowing for physical delivery. In additional embodiments, the physical delivery may be through further electronic means, such as sending a facsimile or a wireless message. The delivery network 158 may be one or more physical networks for delivering items, such as the U.S. Postal System or a commercial delivery system such as FedEx, UPS or DHL for example.

Various operational embodiments are envisioned using the system, including the exemplary embodiments described below in the block diagrams of FIGS. 4-11.

Figure 4:
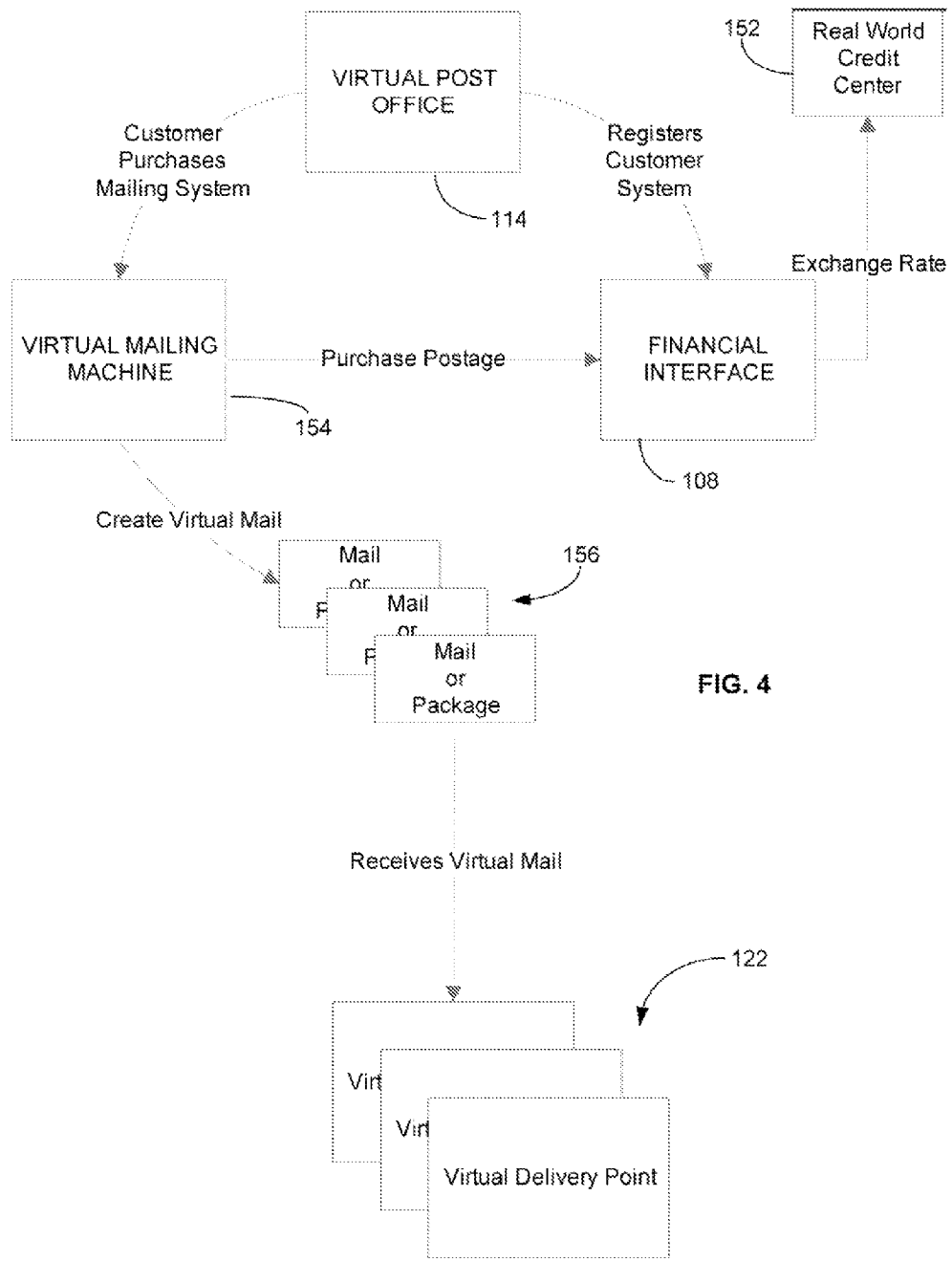
FIGS. 4-5 illustrate block diagrams of embodiments of an operational flow of a virtual mailing system.

In the block diagram of FIG. 4, a virtual post office 114 may be purchased or generated by one or more users. A user may purchase a mailing system, such as purchasing the system in the virtual environment, which may include purchasing the executable code or access to use the executable code for performing such operations. Additionally, the user can also register with the financial interface 108 for purchasing or otherwise processing postage. The financial interface 108 can interact with a real world credit center 152, including monitoring active exchange rates for translating between virtual monetary funds and real world funds.

Additionally, with a purchased mailing system 154, where the user has registered with the financial interface, the user may thereupon purchase postage from the financial interface. This virtual post office 114 may thereupon reside in the metaverse, whereby virtual characters can interact with the post office, such as virtually walking into the doors of the post office.

Through this, users may create virtual mail or packages 156. As described above, these mail or package elements may be electronic assets 120 or may include the electronic assets therein. Through the virtual environment 104, the mail or packages 156 may be thereupon delivered to intended virtual delivery points 122. In one embodiment, a user may have a mailing list or other suitable type of documentation of a recipient and delivery locations, whereupon multiple copies of the electronic assets may be delivered to multiple recipients in a virtual mass mailing operation.

Figure 5:
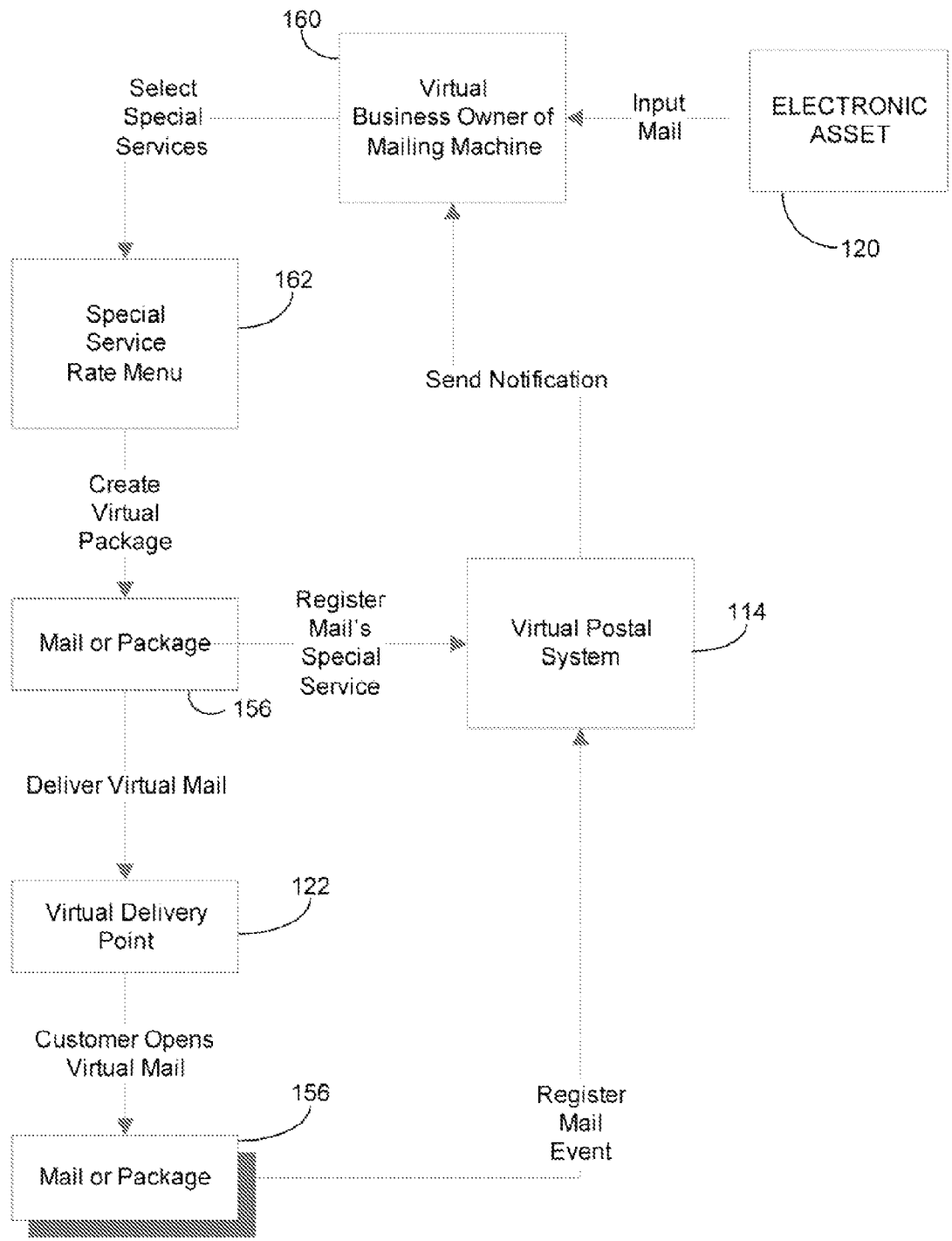

FIG. 5 illustrates a block diagram of one embodiment of a virtual mailing system as may be utilized by the first user sending electronic content. Also, it recognized that the blocks of FIG. 5 may represent services by a service provider rendering virtual mailing services. An electronic asset 120 is provided to a virtual business owner of a mailing machine 160, such as being virtually manually delivered using avatars or other electronic representations.

The owner of the virtual mailing machine may allow for the selection of additional services, where these services can provide an added-value to the sender and be reflected in the metering costs of electronic transmission of the electronic asset 120. In one embodiment, a special service rate menu 162 can indicate fees for various services, where such services may include services such as security measures, delivery confirmation, speed of delivery or any other suitable delivery enhancement. For example, one embodiment may include a security device, which can be incorporated in the postage metering device, within the virtual post office or a stand alone component. This security device can affix or otherwise secure the electronic asset or a virtual package that includes the electronic asset, such as applying an encryption technique, a digital signature, etc.

In the virtual environment, a virtual package 156 may be created. Creation of the virtual package 156 can include the virtual assembly of a box, placing the electronic asset in a box, adding virtual packing materials, sealing the box with virtual tape, etc. From a programming perspective, the creation of the virtual package may include adding metadata or affixing the electronic asset to a program or other type of data routine. An option from the special service rate menu 162 may be delivery confirmation, so that when the mail or package is prepared for delivery, tracking information may be provided to the virtual post office 114 indicating the electronic asset is being delivered.

In one embodiment, techniques can be used to deliver the virtual mail to a recipient's virtual delivery point 122. As described above, this can be accomplished virtually using a delivery service, routing protocols for the electronic transmission of the item or any other suitable delivery means. A recipient can open the mail or package 156, possibly performing one or more delivery conditions, such as signing or otherwise acknowledging the delivery of an item or providing an authentication or identification. Non-repudiation techniques known in the art can be applied to prevent a recipient who actually received the mail or package from later denying it. In another embodiment, the recipient may be requested to pay a surcharge or delivery fee, such as if the original delivery costs were inadequate for example.

In the virtual environment, the receipt or opening of the virtual package may be a registering event, confirming delivery. This may be analogous to the real world delivery confirmation where a recipient signs for a package and that delivery recognition is noted in a back-end system, such as a certified mailing scenario. Delivery confirmation may then be received by the virtual post office 114. Thereupon, a notification may be promptly provided to the owner of the mailing machine 160 or the sender indicating that delivery has been completed.

In addition to benefits in the virtual environment, virtual mailing systems may be used to compliment real world mailing systems. A bridge system may be utilized to coordinate between these two systems, such as the converter 154 and the postal device 156 described above with respect to FIG. 3. For example, a locked electronic asset may be delivered in the virtual world and the key to unlock the asset may be sent using physical delivery means.

Figure 6:
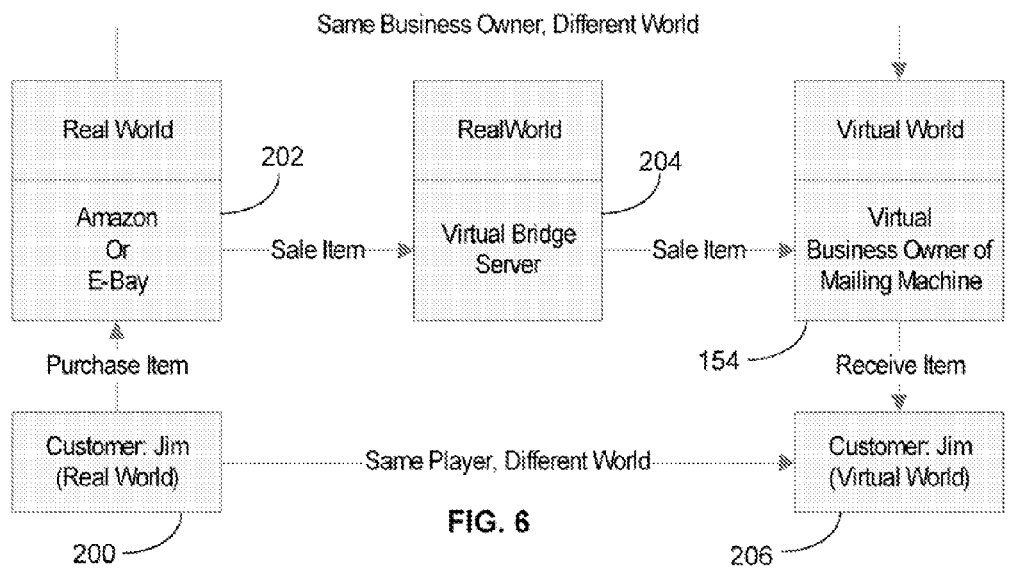
FIGS. 6-11 illustrate block diagrams of different embodiments of operational flows of virtual mailing systems.

FIG. 6 illustrates one exemplary embodiment of the same customer purchasing something in the real world for use in the virtual world, such as purchasing a gaming element for use in a virtual game world. In this embodiment, the same business owner may also provide the bridge between the virtual and real world. In the real world, a customer 200 can purchase an item, e.g., from a web site or electronic commerce location in the real world 202. The purchased item can then be provided to a virtual bridge server 204 where this item is then converted into an element usable in the virtual world. For example, with the converter 154 of FIG. 3, the virtual bridge server 204 may include operations for converting the purchased item into being usable in the virtual environment. One example may be a book, where the customer could purchase the physical book, but then have an electronic copy of the book in the virtual world. In this example, the bridge server 204 may simply reference a database of electronic books and upon verification of the purchase, retrieve the electronic version of the book for submission to the virtual mailing machine 154 in the virtual world.

Through mailing techniques described above, the electronic asset, in this example being an electronic book, is then delivered to the customer 206 in the virtual world. Thus, a customer may purchase an item in the real world and have this item then delivered to the virtual world. Delivery in the virtual world using the virtual post office can thus bridge the gap between physical restrictions in the real world and the virtual restrictions of the virtual world.

Figure 7:
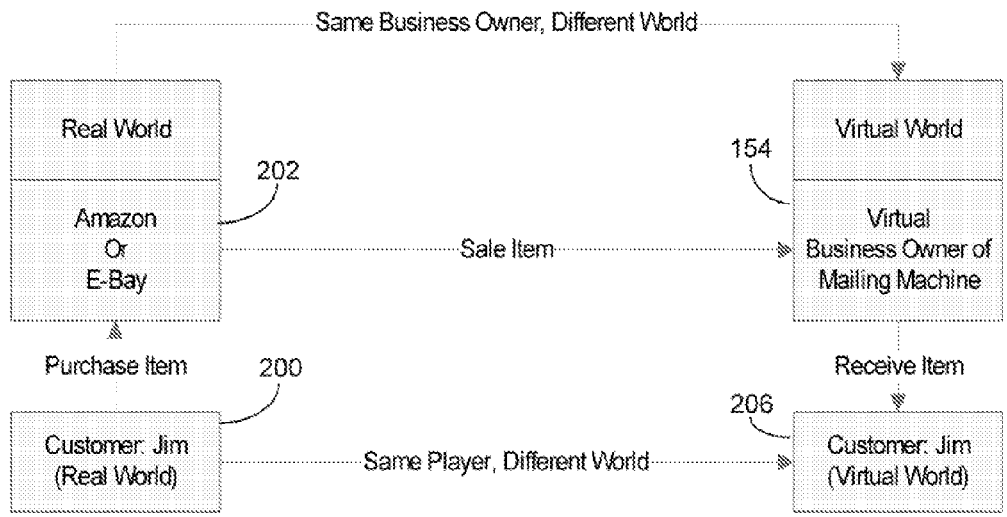

FIG. 7 illustrates another embodiment of the virtual mailing system capable of being utilized relative to real world delivery techniques. In this embodiment, the same customer 200 having a virtual persona 206 can purchase a virtual item in the real world system 202. For example, customer 200 may be purchasing power, status elements or any other element usable in the virtual world, for the virtual persona 206. Using known purchasing operations, the user 200 can purchase the item, which can then be provided to the virtual mailing machine 154. This embodiment need not use the virtual bridge server because the purchased item is already a virtual element. Through the above-described delivery techniques, the purchased electronic asset can then be delivered and received by the customer 206 in the virtual world.

Figure 8:
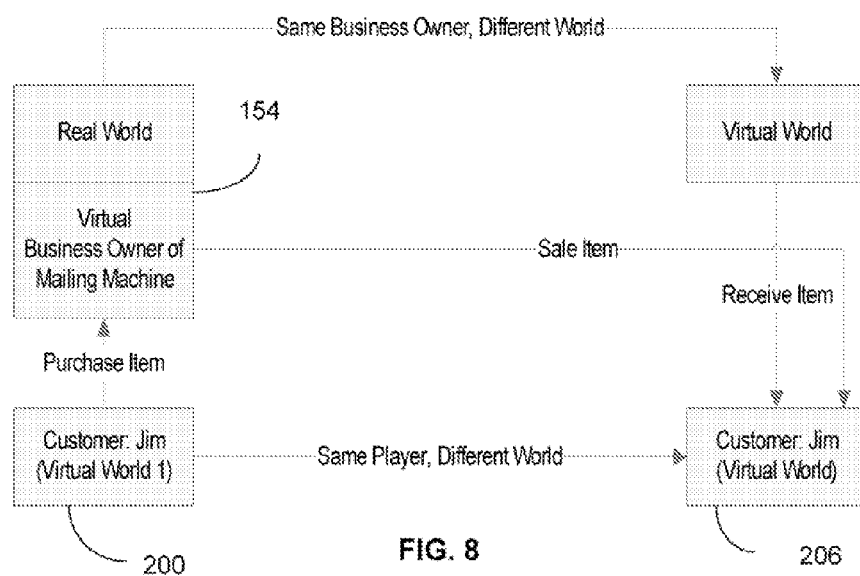

FIG. 8 illustrates another embodiment in which the customer 200 purchases an item in the real world. The seller can use a virtual mailing machine 154 such that directly upon purchase, the seller can mail the electronic asset in the virtual world. In the embodiment of FIG. 7, the seller may have utilized a separate mailing entity, but in this embodiment, the seller can virtually mail the asset directly to the virtual customer 206 in the virtual world.

The exemplary embodiments of FIGS. 6-8 can also be executed in reverse where a user can virtually purchase an item and then this item can be physically delivered to the user. A service provider may convert a virtual asset into a physical asset, so the asset may be virtually mailed to the service provider, such as the example of an electronic book being exchanged for a physical copy of the same book and subsequent physical delivery of the book. Additionally, a combination of virtual mailing and physical mailing may allow for additional security features. For example, a virtual purchase may be verified by requiring a secondary aspect of the purchase be transmitted in the real world. An example of this may be where a user purchases an item in the virtual world and the packaging to the item includes layers of security. A security level may implemented using a password or a cryptographic key that corresponds to that level. The item itself may be shipped virtually and the password or key be sent via regular U.S. Mail. Similarly, a real world purchase may be verified by requiring some action in relation to a virtual message transmission. For example, a purchase of a voucher representing prepaid minutes for a telecommunications service may require the confirmed delivery of a piece of virtual mail that can provide certain information necessary for activating the voucher and crediting the minutes to the purchaser's account.

Figure 9:
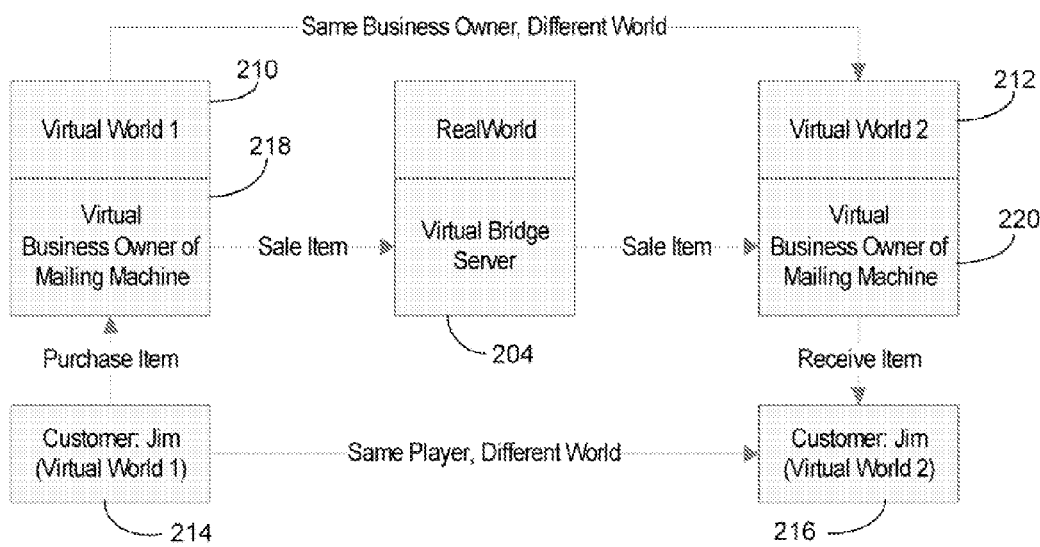

Virtual mailing may be accomplished across different virtual platforms or different virtual worlds. FIG. 9 illustrates an embodiment of mailing an electronic asset between a first virtual world 210 and a second virtual world 212. A first virtual user 214 can purchase an item in the first world 210 and mail the item to the second virtual world 212. The first virtual mailing machine 218 in the first virtual world 210 can process the electronic asset for mailing and deliver the asset to the virtual bridge server 204, as discussed above. The item can then be processed in the bridge 204, which may include any virtual world to virtual translation that may be required. If the electronic asset is in a universal or mutually recognized format, the virtual bridge server may translate packing or shipping information to allow the item to be delivered in the second virtual world 212. In this embodiment, the virtual bridge server 204 can provide the electronic asset to a second virtual mailing machine 220 in the second virtual world 212. The second virtual mailing machine 220 may thereupon electronically deliver the electronic asset to the second virtual persona 216. Thereby, through the use of two virtual mailing machines 218 and 220 and the virtual bridge server 204, an electronic asset may be mailed across different virtual worlds.

Figure 10:
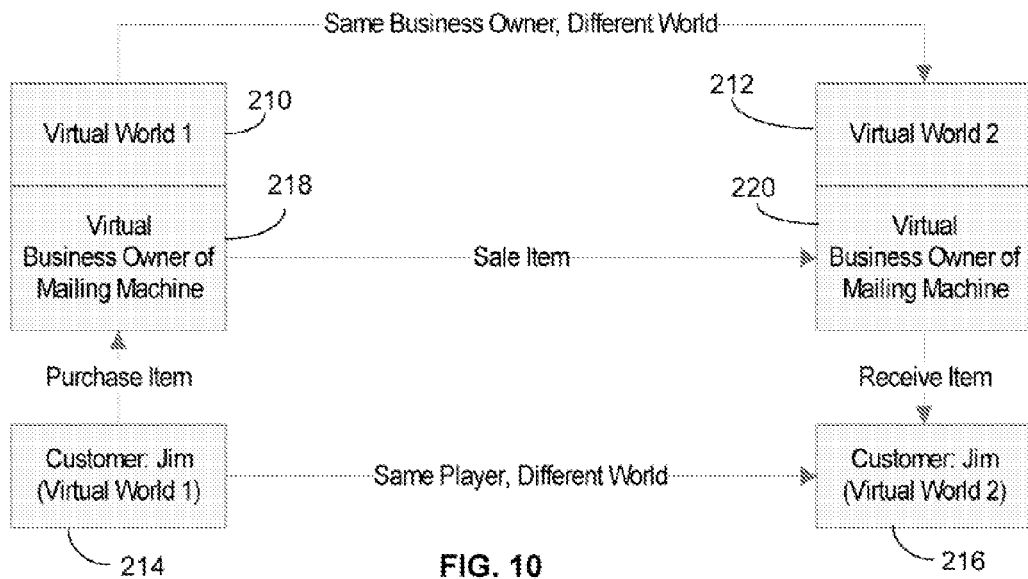

FIG. 10 illustrates another embodiment where the virtual mailing systems 218 and 220, of the two virtual worlds 210 and 212, can be compatible. The first virtual customer 214 can send the electronic asset through the first virtual mailing machine 218. The asset can be delivered to the second virtual mailing machine 220 and then routed to the second virtual customer 216. Delivery between mailing systems 218 and 220 may be performed using known data transmission protocols or techniques, such as encapsulating the electronic asset in a secured electronic transmission or sending a data retrieval request and subsequent data retrieval operations.

Figure 11:
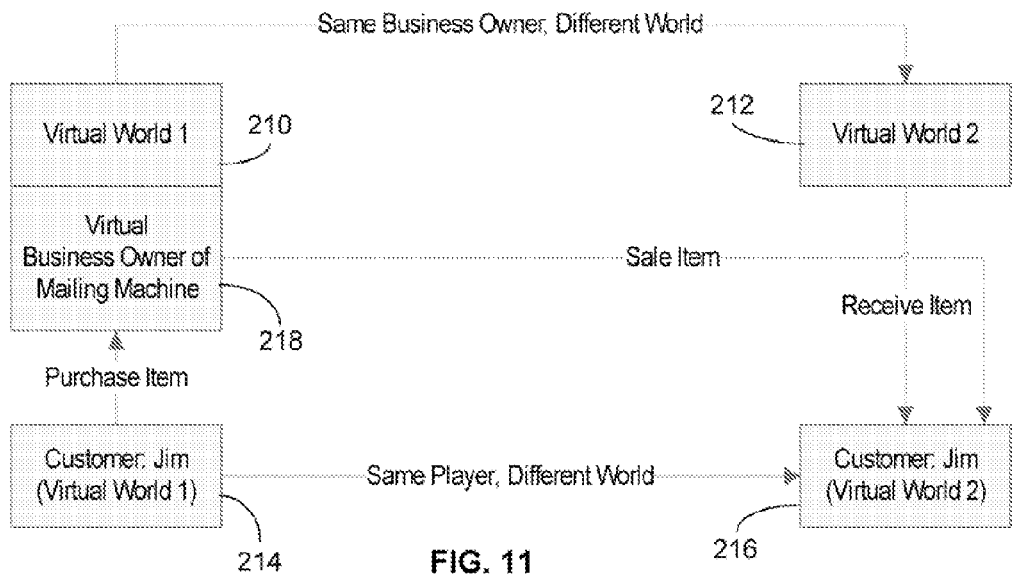

FIG. 11 illustrates the embodiment where the second virtual world 212 can receive a delivery from the virtual mailing system 218 in the first virtual world 210. Therefore, the first virtual customer 214 can send the electronic asset to the second virtual customer 216. This embodiment may be realized in complimentary virtual worlds that utilize the same or complimentary virtual processing environments such that any translation or manipulation of data or delivery mechanisms is not required.

The virtual post office can provide for virtual mailing. The utilization of a metering device that coordinates with payment based on real world funds can allow for the effective utilization of asset or information delivery in the virtual environment. The virtual nature can also allow for numerous opportunities through solely virtual activity and operations complimenting real world delivery. By way of example, a party may send mass mailings in a virtual environment to virtual users and may only be charged for opened mail items and spare expenses for delivered but not opened items. As this virtual post office resides in the processing environment, the generation of electronic assets can be performed using any suitable technique whereby the virtual post office allows for metered delivery of electronic assets to intended recipients.

The preceding description is intended to illustrate and not limit the scope of the invention. One of skill in the art will appreciate additional embodiment that, although not described explicitly above, fall within the scope of the claims.

What is claimed is:

1. A computer-implemented method for virtual mailing, the method comprising:
   converting a physical asset to an electronic asset, the electronic asset comprising a virtual object usable by a virtual character controlled by a user of a virtual environment in which a virtual post office is implemented, said virtual post office and said virtual environment being implemented by the computer system;
   receiving, by the computer system, the electronic asset in the virtual post office;
   accessing a postage metering device associated with the virtual post office;
   assigning a metering rate for the delivery of the electronic asset; and
   processing, by the computer system, monetary funds associated with the metering rate and provided for transmission of the electronic asset by a carrier to an intended recipient.

2. The method of claim 1 further comprising:
   delivering the electronic asset to an intended recipient.

3. The method of claim 2 wherein the electronic asset is delivered to a virtual delivery point.

4. The method of claim 1 further comprising:
   translating physical monetary funds to virtual monetary funds;
   processing the virtual monetary funds in the postage metering device for the metering rate for delivery of the electronic asset.

5. The method of claim 4 wherein the physical funds may be converted from a first physical currency directly to a second physical currency.

6. The method of claim 1 wherein the virtual object is created within the virtual environment.

7. The method of claim 1 wherein the virtual object is an electronic key usable to activate or authorize a virtual component.

8. The method of claim 1 wherein the electronic asset is a delivery confirmation for a physical delivery conducted outside of the virtual environment.

9. The method of claim 8 wherein the delivery confirmation includes an electronic key for activating a physically delivered item.

10. The method of claim 1 further comprising:
    affixing a virtual security device to the electronic asset.

11. The method of claim 10 wherein the virtual security device is associated with the postage metering device for processing monetary funds relating to the security component.

12. The method of claim 10 wherein the security component includes a delivery confirmation.

13. The method of claim 1 further comprising:
    generating a second physical asset from the electronic asset for physical delivery.

14. The method of claim 13, wherein the second physical asset is generated using a printing device and a postage metering device.

15. The method of claim 13 wherein a secondary delivery of at least one of the second physical asset or the electronic asset compliments the delivery of the other corresponding one of the electronic asset and second physical asset.

16. The method of claim 1 further comprising:
    delivering the electronic asset to an intended recipient in the virtual environment using at least one virtual delivery avatar.

17. The method of claim 1 wherein the delivery of the electronic asset is electronically addressed to a virtual recipient.

18. The method of claim 1 wherein the postage metering device is purchased through a virtual retail outlet.

19. The method of claim 1 wherein the postage metering device is purchased in a physical retail outlet.

20. The method of claim 1 further comprising:
    virtually using the postage metering device through a user interface.

21. The method of claim 1, wherein the postage metering device is a physical device.

22. The method of claim 1, wherein the carrier is an owner of the virtual environment.

23. The method of claim 1, wherein the virtual environment is a virtual game world and the virtual object is a gaming object for use in the virtual game world.

24. The method of claim 1, wherein the intended recipient is a second virtual character controlled by a second user of the virtual environment.

25. The method of claim 1, wherein the intended recipient is a second user of the virtual environment.

26. The method of claim 1, wherein the virtual object is an electronic book corresponding to a physical book purchased by the user.

27. The method of claim 1, wherein the electronic asset is received from a second virtual environment, the second virtual environment being separate and distinct from the virtual environment in which the virtual post office is implemented.

28. A non-transient computer-readable medium storing a plurality of instructions which, when executed by a processor, cause the processor to perform a method comprising:
   converting a physical asset to an electronic asset, the electronic asset comprising a virtual object usable by a virtual character controlled by a user of a virtual environment in which a virtual post office is implemented, said virtual post office and said virtual environment being implemented by the computer system;

receiving, by the computer system, the electronic asset in the virtual post office;

accessing a postage metering device associated with the virtual post office;

assigning a metering rate for the delivery of the electronic asset; and processing monetary funds associated with the metering rate and provided for transmission of the electronic asset by a carrier to an intended recipient.

29. The medium of claim 28, said method further comprising:

translating physical monetary funds to virtual monetary funds;

processing the virtual monetary funds in the postage metering device for the metering rate for delivery of the electronic asset.

30. The medium of claim 28 wherein the virtual asset is an electronic key usable to activate or authorize a virtual component.

31. The medium of claim 28, said method further comprising:

affixing a virtual security device to the electronic asset.

32. The medium of claim 31 wherein the virtual security device is associated with the postage metering device for processing monetary funds relating to the security component.

33. The medium of claim 28, said method further comprising:

generating a second physical asset from the electronic asset for physical delivery.

34. The medium of claim 33, wherein the second physical asset is generated using a printing device and a postage metering device.

35. The medium of claim 33 wherein a secondary delivery of at least one of the second physical asset or the electronic asset compliments the delivery of the other corresponding one of the electronic asset and second physical asset.

36. The medium of claim 28 wherein the electronic asset is a delivery confirmation for a physical delivery conducted outside of the virtual environment.

37. The medium of claim 28, wherein the postage metering device is a physical device.

38. A computer system comprising:

a processor;

a memory in communication with the processor and storing instructions that cause the processor to perform a method comprising:

receiving an electronic asset in a virtual post office, the electronic asset comprising a virtual object usable by a virtual character controlled by a user of a virtual environment in which the virtual post office is implemented, said virtual post office and said virtual environment being implemented by a computer system;

accessing a postage metering device associated with the virtual post office;

assigning a metering rate for the delivery of the electronic asset; and processing monetary funds associated with the metering rate and provided for transmission of the electronic asset by a carrier to an intended recipient; and a bridge server configured and arranged to receive a physical item owned by the user and to generate a virtual object within the virtual environment corresponding to the physical item.

39. The system of claim 38, said method further comprising:

translating physical monetary funds to virtual monetary funds;

processing the virtual monetary funds in the postage metering device for the metering rate for delivery of the electronic asset.

40. The system of claim 38 wherein the virtual asset is an electronic key usable to activate or authorize a virtual component.

41. The system of claim 38, said method further comprising:

affixing a virtual security device to the electronic asset.

42. The system of claim 41 wherein the virtual security device is associated with the postage metering device for processing monetary funds relating to the security component.

43. The system of claim 38, said method further comprising:

generating a second physical asset from the electronic asset for physical delivery.

44. The system of claim 43, wherein the second physical asset is generated using a printing device and a postage metering device.

45. The system of claim 43 wherein a secondary delivery of at least one of the second physical asset or the electronic asset compliments the delivery of the other corresponding one of the electronic asset and second physical asset.

46. The system of claim 38 wherein the electronic asset is a delivery confirmation for a physical delivery conducted outside of the virtual environment.

47. The system of claim 38, wherein the postage metering device is a physical device.

* * * * *